United States Patent [19]

Fitch

[11] Patent Number: 4,918,709
[45] Date of Patent: Apr. 17, 1990

[54] DATA DEMODULATOR BAUD CLOCK PHASE LOCKING

[75] Inventor: Alan P. Fitch, Wallington, England
[73] Assignee: U.S. Philips Corporation, New York, N.Y.
[21] Appl. No.: 280,613
[22] Filed: Dec. 5, 1988
[30] Foreign Application Priority Data

Dec. 11, 1987 [GB] United Kingdom ............... 8729018

[51] Int. Cl.⁴ ..................................... H03D 3/20
[52] U.S. Cl. .................................. 375/82; 375/83; 375/119; 329/313
[58] Field of Search ............... 375/80, 81, 82, 110, 375/106, 120, 116, 83; 329/104, 110, 313

[56] References Cited

U.S. PATENT DOCUMENTS

| | | | |
|---|---|---|---|
| 3,971,996 | 7/1976 | Motley et al. | 328/55 |
| 4,280,224 | 7/1981 | Chethik | 375/116 |
| 4,295,222 | 10/1981 | Van Uffelen | 375/106 |
| 4,359,692 | 11/1982 | Ryan | 329/50 |
| 4,475,217 | 10/1984 | Hughes | 375/81 |
| 4,484,337 | 11/1984 | Leclert et al. | 375/81 |
| 4,644,566 | 2/1987 | Vercellotti et al. | 375/116 |
| 4,814,719 | 3/1989 | Guyer | 375/120 |

OTHER PUBLICATIONS

Lindsey & Chie, A Survey of Digital Phase-Locked Loops, Proceedings of the IEEE, vol. 69, No. 4, Apr. 1981.

Primary Examiner—Benedict V. Safourek
Assistant Examiner—Tesfaldet Bocure
Attorney, Agent, or Firm—David R. Treacy

[57] ABSTRACT

For locking a locally generated baud rate clock signal to the baud rate of a received phase-modulated signal, a multiplifer and measuring circuit produces two quadrature phase bi-level channel signals. In each channel signal the two levels over two given periods which are phased apart by 90° are measured to determine the sign ($1 = +1$, $0 = -1$) of the channel signals in each of the two periods. A circuit for recovering the timing of the incoming baud rate produces a narrow pulse corresponding to each of the four sign signals thus produced. These pulses are combined into a single continuous pulse sequence. Phase detectors determine the occurrence of successive pairs of the narrow pulses relative to the edge of the local baud clock pulses, and the phase of these clock pulses is adjusted in accordance with the average of the early and late detections.

17 Claims, 5 Drawing Sheets

DATA DEMODULATOR BAUD CLOCK PHASE LOCKING

BACKGROUND OF THE INVENTION

This invention relates to coherent data demodulators for the demodulation of shift keyed signals which are phase-modulated to represent multibit data symbols.

The invention relates more particularly to such coherent data demodulators of a type in which, in the demodulation process, two quadrature phased channel signals are produced by separately multiplying together an incoming shift keyed signal of a given carrier frequency and each of two quadrature phased versions of a locally generated carrier signal of nominally the same frequency as said carrier frequency.

In a demodulator of the above type data symbols can thereafter be detected from either the incoming shift keyed signal or from either one of the two channel signals by determining the occurrence of transitions therein relative to those in a locally generated baud rate clock signal.

In order to achieve reliable data detection, both the locally generated carrier signal and the locally generated baud rate signal clock are required to be continuously adjusted into coherent phase relationship with the incoming shift keyed signal. This adjustment can be accomplished by using digital phase-locked loops (DPLL). A single DPLL can be used for both those adjustments, or they can be carried out using separate DPLL's in a carrier timing recovery circuit and a baud rate timing recovery circuit, respectively.

The article "A survey of Digital Phase-Locked Loops", published in Proceedings of the IEEE, Vol. 69, No. 4, April 1981, gives useful information on the state of the art.

Because the digital data is in the form of differently phased multi-bit (e.g., dibit) symbols, it becomes necessary to detect when a change in phase between adjacent symbols has occurred in order to recover the data. The detection requires an accurate relationship between the symbol or baud rate timing of the incoming signal and that of the locally generated baud rate clock. Phase information related to the baud rate timing is present as the position of all the transitions in the incoming signal and can be used to derive an estimate of the baud rate timing by averaging the occurrence of all these transitions over a relatively long period.

In a data demodulator of the above type these transitions which can be used for baud rate timing recovery are also present in each of the two channel signals and also in the resultant baseband signal as constituted by binary data in the detected symbols.

Using the incoming shift keyed signal for the recovery of the baud rate timing has the advantage that since this signal has not yet been processed at all, it contains all the information about the phase transitions. However, using the incoming shift keyed signal has the disadvantages that the carrier information is still present and must be removed and that because the signal has not been processed (except possibly by a receive filter) the signal is likely to be corrupted by noise.

The requirement of removing high frequency noise from the incoming shift keyed signal implies a need for a high sampling rate, while the requirement of averaging transitions over a long period implies a need for a low sampling rate. This necessitates either using a data demodulator with a high sampling rate front end, followed by a low sampling rate PLL, or using a high sampling rate throughout the demodulator, with a consequential increase in the complexity and hence the cost of the demodulator. Since the carrier information has to be removed to recover the baseband signal, it is thought more appropriate to derive the input to the baud rate timing recovery circuit at some point after the recovery of the carrier information, in order to take advantage of filtering introduced by the carrier timing recovery circuit. However, using one of the two channel signals still has the disadvantage that although the carrier information has been removed therefrom a twice carrier frequency component is present therein as a result of the multiplying process and, also, the noise introduced by transmission is still present.

Recovery of the baud rate timing using the resultant baseband signal overcomes the abovementioned disadvantages of noise and high-frequency sampling, but the use of this signal gives rise to difficulties in that the sample rate is low (e.g. in a proposed data system it is only twice the carrier frequency which amounts to only four samples per baud period), and in that the PLL for the carrier timing recovery circuit can lock up at different points in such a way (as will be described) as to alter the instant in time at which the data transitions occur relative to the actual baud rate transitions, thereby causing different sampling points to be seen by the baud rate timing recovery circuit.

The first of these two difficulties can be overcome to a material extent by using a long time constant for the PLL in the baud rate timing recovery circuit: this helps to remove the affect of the low sampling rate at the input to the circuits by effectively averaging out over time the quantisation error in the positions of the transitions.

SUMMARY OF THE INVENTION

It is an object of the present invention to provide a method of, and/or an arrangement for, mitigating the second of the aforementioned difficulties in a data demodulator of the type set forth above.

According to the invention, a method of phase-locking a locally generated baud rate clock signal in a coherent data demodulator to the baud rate of a received shift keyed signal which is phase-modulated to represent digital data, comprises:

separately multiplying together a received shift keyed signal of a given carrier frequency and each of two quadrature phased versions of a locally generated carrier signal of said given frequency to produce two bi-level channel signals;

determining, with respect to each channel signal, in each period thereof occurring in each successive half cycle of one of the two channel signals, a respective first signal representing which is the predominant level of this channel signal in the period;

determining, with respect to each channel signal in each period thereof occurring in each successive half cycle of the other of the two channel signals, a respective second sign signal representing which is the predominant level of this other channel signal in the period;

producing a narrow pulse corresponding to each of the four sign signals thus produced;

combining all the narrow pulses into a single continuous pulse sequence;

detecting in each period of the baud rate clock which narrow pulses in the sequence are early and which are late relative to an edge of the baud rate clock pulse; and advancing or retarding the phase of the baud rate clock in accordance with this detection to adjust the baud rate clock phase into a desired relationship with the baud rate transitions in the received shift keyed signal.

In carrying out the invention, the phase of the baud rate clock may be advanced or retarded only with respect to successive pairs of early or late pulses, as the case may be. Furthermore, a number of such detections may be averaged over a period before an increment of phase adjustment of the baud rate clock phase is effected.

Also, according to the invention, in a coherent data demodulator of the type set forth above, an arrangement for phase-locking a locally generated baud rate clock to the baud rate of a received shift keyed signal which is phase-modulated to represent digital data, comprises:

input means for receiving a phase-modulated shift keyed signal of a given carrier frequency;

reference signal generator means for producing two quadrature phase versions of a locally generated carrier signal of said given frequency;

multiplier means connected to receive said shift keyed signal and said two locally generated carrier signal versions and operable to multiple separately the shift keyed signal with each said version to produce two bi-level channel signals.

first measuring means connected to receive said two channel signals and operable with respect to each channel to produce, for each period thereof occurring in each successive half cycle of one of the channel signals, a respective first sign signal representing which is the predominant level of this channel signal in the period;

second measuring means connected to receive said two channel signals and operable with respect to each channel to produce, for each period thereof occurring in each successive half cycle of the other of the two channel signals, a respective second sign signal representing which is the predominant level of this other channel signal in the period;

pulse means for producing a narrow pulse corresponding to each of the four sign signals thus produced;

combining means for combining all the narrow pulses into a single continuous pulse sequence;

detector means for detecting in each period of the baud rate clock which narrow pulses in the sequence are early and which are late relative to an edge of the baud rate clock pulse; and means for advancing or retarding the phase of the baud rate clock in accordance with this detection to adjust the baud rate clock phase into a desired phase relationship with the baud rate transitions in the received shift keyed signal.

The invention also extends to a coherent data demodulator embodying such a phase-locking arrangement.

In order that the invention may be more fully understood reference will be made by way of example to the accompanying drawings.

DESCRIPTION OF THE PREFERRED EMBODIMENT

Figure 1:
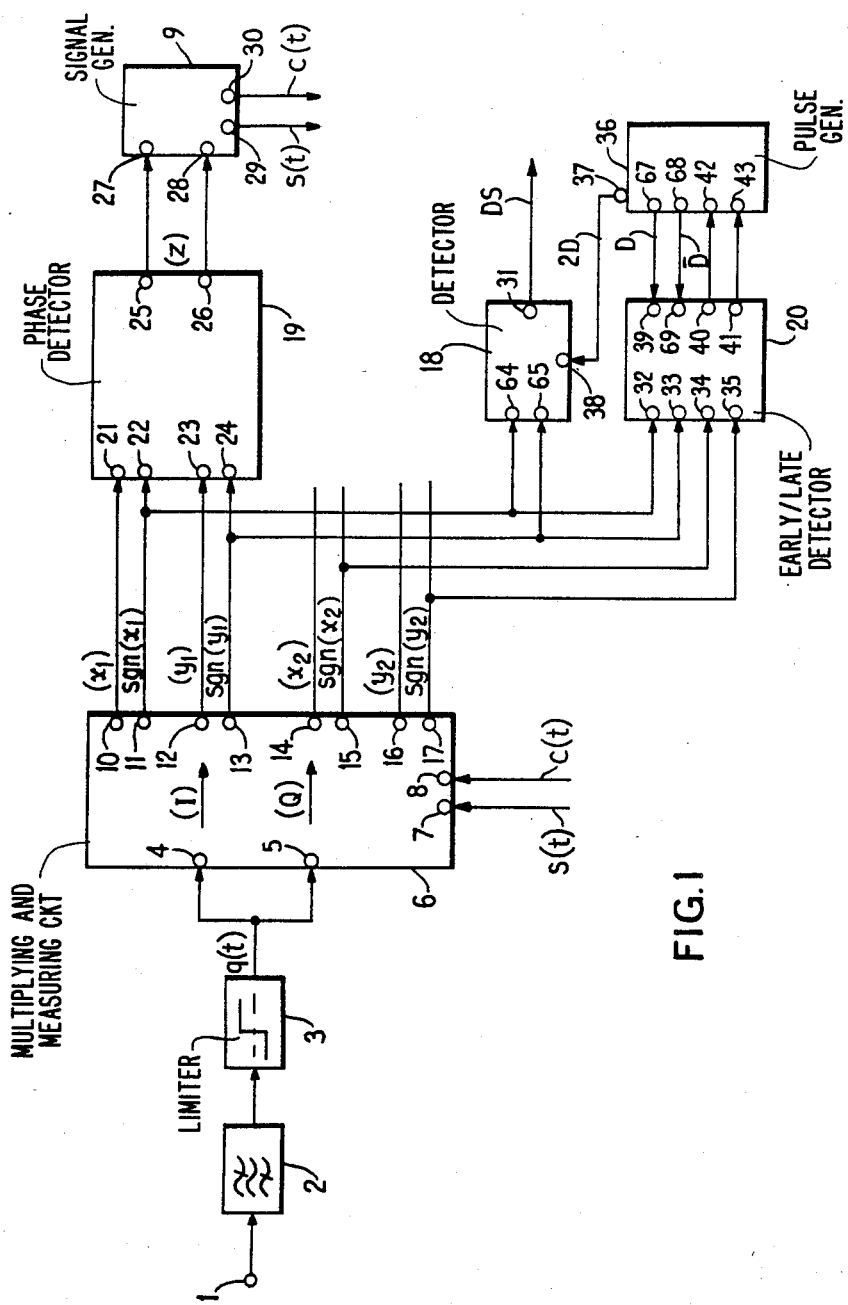
FIG. 1 is a block diagram of a coherent data demodulator embodying the present invention.

Referring to the drawings, the coherent data demodulator shown in FIG. 1 has an input terminal 1 to which an incoming phase shift keyed signal is applied. For the purposes of the present description it is assumed that this incoming signal is a DQPSK signal, that is a quadrature phase shift keyed signal which has been produced by differential encoding of data bits of a data stream. The encoding method employed is suitably in accordance with the CCITT Recommendation V22 which specifies, among other things, that for a data stream of 1200 bits per second the data stream to be transmitted shall be divided into symbols of 2 consecutive bits (dibits). Each dibit value shall be encoded as a phase change relative to the preceding symbol as set forth in the Table I below.

TABLE I

| Symbol(S) values (1200 bits/s) | Phase Change |
| --- | --- |
| 00 | +90° |
| 01 | 0° |
| 11 | +270° |
| 10 | +180° |

The incoming DQPSK signal at the input terminal 1 is applied to a receive filter 2 which subjects this incoming signal to equivalent baseband pulse shaping and delay equalisation. This receive filter 2 can be a high order active filter of known form. The output signal from the filter 2 is hard limited by a limiter 3 which produces a resultant phase keyed signal q(t) which can be approximated by the equation:

$$q(t) = ssq(\omega_c t + \phi_i) \quad (1)$$

where ssq signifies a square wave and $\phi_i = \theta + n\pi/2$, with each value of n being equally likely in the case of random DQPSK, where n=0, 1, 2, 3.

The resultant signal q(t) is applied to first and second signal inputs 4 and 5 of a multiplying and measuring circuit arrangement 6 and two reference signals s(t) and c(t) are applied respectively to first and second reference inputs 7 and 8 of this arragement 6. These two reference signals are generated by a reference signal generator 9, as will be described, and can be represented by the equations:

$$s(t) = ssq(\omega_c t) \quad (2)$$

$$c(t) = csq(\omega_c t) \quad (3)$$

where ssq and csq signify square wave sine and cosine phased versions, respectively, of the locally generated carrier signal $\omega_c$.

Figure 9:
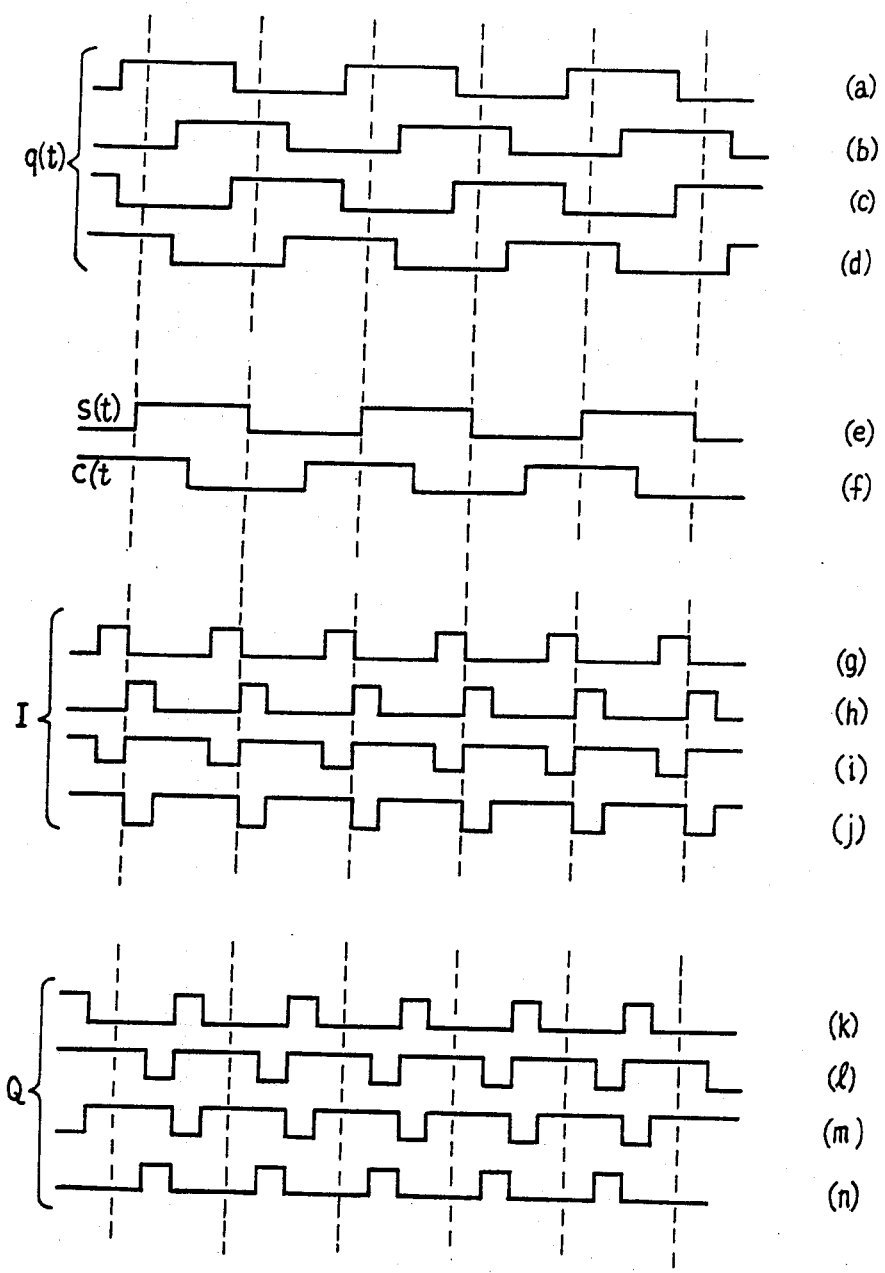
FIGS. 9 and 10 show explanatory waveform diagrams.

The instantaneous resultant signal q(t) from the limiter 3 can have any one of four different phases dependent on the dibit value whih it represents at any time. Waveform diagrams (a), (b), (c) and (d) in FIG. 9 represent these four possible phases, respectively, and the two reference signals s(t) and c(t) are represented by the waveform diagrams (e) and (f).

Within the circuit arrangement 6, the signal q(t) is multiplied by each of the reference signals s(t) and c(t)

to produce respective channel signals (I) and (Q) which, ignoring the double frequency components produced by the multiplications, can be represented by the equations:

$$(I) = ssq(\phi_i + \theta) \quad (4)$$

$$(Q) = csq(\phi_i + \theta) \quad (5)$$

where $\theta$ is an arbitrary carrier phase error. In FIG. 9, waveform diagrams (g), (h), (i) and (j) represent the four possible bi-level forms of the channel signal (I) and waveform diagrams (k), (l), (m) and (n) represent the four possible bi-level forms of the channel signal (Q).

One level of a channel signal corresponds to a positive phase difference of the signal q(t) relative to the reference signals s(t) or c(t) as the case may be, and the other level corresponds to a negative phase difference. These channel signals (I) and (Q) contain phase error information with respect to both the carrier timing and the baud rate timing of the incoming signal relative to the locally generated carrier signal and a baud rate clock signal, respectively. These channel signals (I) and (Q) are therefore further processed by the arrangement 6 to produce at pairs of outputs 10,11; 12,13; 14,15; and 16,17, signals $(x_1)$, $sgn(x_1)$; $(y_1)$, $sgn(y_1)$; $(x_2)$, $sgn(x_2)$; and $(y_2)$, $sgn(y_2)$, respectively. The signals $(x_1)$, $(x_2)$ and $(y_1)$, $(y_2)$ represent the difference in the durations of the two levels of the relevant channel signal (I) or (Q) during successive half cycles of the reference signals s(t) and c(t) and the signals $sgn(x_1)$, $sgn(y_1)$ and $sgn(x_2)$, $sgn(y_2)$ repesent which level is the predominant level. As will be described, the signals $sgn(x_1)$ and $sgn(y_1)$ are used by a circuit arrangement 18 to recover the data in the incoming signal, the signals $(x_1)$, $sgn(x_1)$, $(y_1)$ and $sgn(y_1)$ are used by a circuit arrangement 19 to correct phase error between the carrier frequency of the incoming signal and that of the locally generated carrier signal, and the signals $(x_1)$, $(y_1)$, $(x_2)$ $(y_2)$ are used by a circuit arrangement 20 to recover the baud rate timing from the incoming signal.

Consider first the correction of the carrier phase, an incoming DQPSK signal will result in the signal q(t) having a random succession of the four different phases represented by the waveform diagrams (a), (b), (c) and (d) of FIG. 9, depending on the dibit values used to modulate the DQPSK signal. The values at any time of the signals $(x_1)$ and $(y_1)$ are due not only to the phase (frequency) difference of the signal q(t) relative to the reference signals s(t) and c(t), but also to the quad-phase data in the DQPSK signal. Therefore, it is not feasible to use the $(x_1)$ and $(y_1)$ signal values directly as a measure of the instantaneous phase difference between the signal q(t) and the reference signals s(t) and c(t), in order to carry out a phase correction for locking the hase of the reference signal generator 9 which produces the reference signals to the phase of the incoming DQPSK signal.

The signals $(x_1)$, $sgn(x_1)$, $(y_1)$ and $sgn(y_1)$ are applied to respective inputs 21, 22, 23 and 24 of the circuit arrangement 19 which further processes these signals in accordance with an algorithm, the results of which are given in the following Table II, to produce a resultant phase error signal (z) at outputs 25 and 26.

TABLE II

| $(x_1)$ | $(y_1)$ | $sgn(x_1)$ | $sgn(y_1)$ | (z) |
|---|---|---|---|---|
| 1 | 1 | +1 | +1 | $|x_1| - |y_1|$ |
| 0 | 1 | -1 | +1 | $|y_1| - |x_1|$ |
| 0 | 0 | -1 | -1 | $|x_1| - |y_1|$ |
| 1 | 0 | +1 | -1 | $|y_1| - |x_1|$ |

Figure 8:
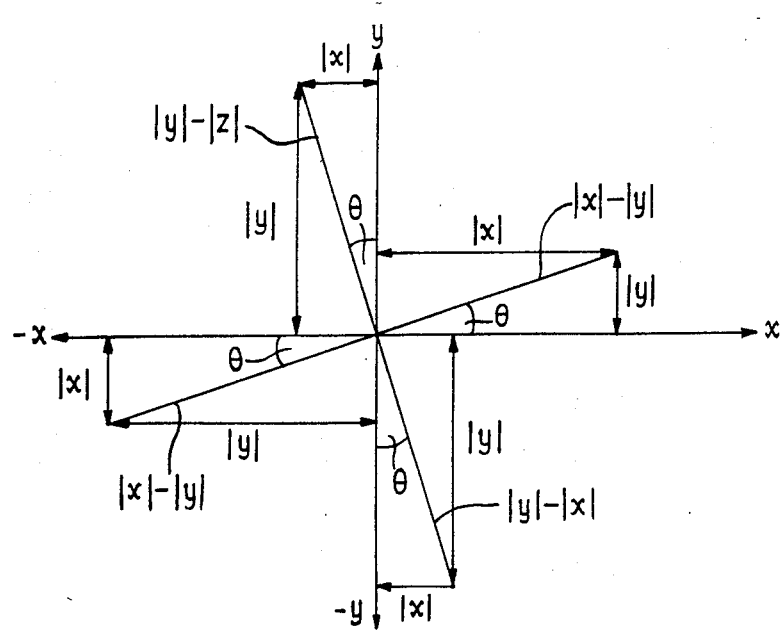
FIG. 8 shows an error signal vector diagram.

In the above table, it is assumed that the values 1 and 0 represent the two channel levels. When level 1 predominates to give a positive error signal the sign signal has the value +1, and when level 0 predominates to give a negative error signal the sign signal has the value -1. Depending on the relative values (+1 or -1) of $sgn(x_1)$ and $sgn(y_1)$, the modulus of $x_1$ is subtracted from the modulus of $y_1$, or vice versa. By using this algorithm the resultant error signal (z) is made quadrature insensitive in that it takes no account of the quad-phased data in the received signal. This is illustrated diagrammatically in FIG. 8 which shows that for an arbitrary phase error $\theta$, the error signal (z) can be produced in respect of any one of four different phase quadrants. The effect of this is that the locally generated carrier signal can be locked relative to the received signal at any one of four different locking points. The error signal (z) is applied to inputs 27 and 28 of the reference signal generator 9, which produces the reference signals s(t) and c(t) at outputs 29 and 30.

The sign signals $sgn(x_1)$ and $sgn(y_1)$ each contain information as to each phase change in the signal q(t), which information is the baseband data used to modulate the incoming signal DQPSK. The circuit arrangement 18 receives the signals $sgn(x_1)$ and $sgn(y_1)$ at respective inputs 64 and 65 and is operable to detect the data transitions in these signals and to provide a resultant data output signal DS at an output 31.

The baud rate of the baseband data is also represented by the data transitions in the signals $sgn(x_1)$ and $sgn(y_1)$ and, furthermore, it is also represented by the data transitions in the additional sign signals $(x_2)$ and $(y_2)$. These four sign signals are applied to respective inputs of the 32, 33, 34 and 35 of the circuit arrangement 20 which is operable to phase lock data clock pulses 2D produced by a clock pulse generator 36 at an output 37 to the incoming baud rate. The clock pulses 2D are applied to an input 38 of the circuit arrangement 18 to provide a data entry window. Clock pulses D and $\overline{D}$ of baud rate are fed from outputs 67 and 68 to inputs 39 and 69 of the circuit arrangement 20 which produces baud rate timing recovery data at outputs 40 and 41, this data being supplied at inputs 42 and 43 of the clock pulse generator 36.

Figure 2:
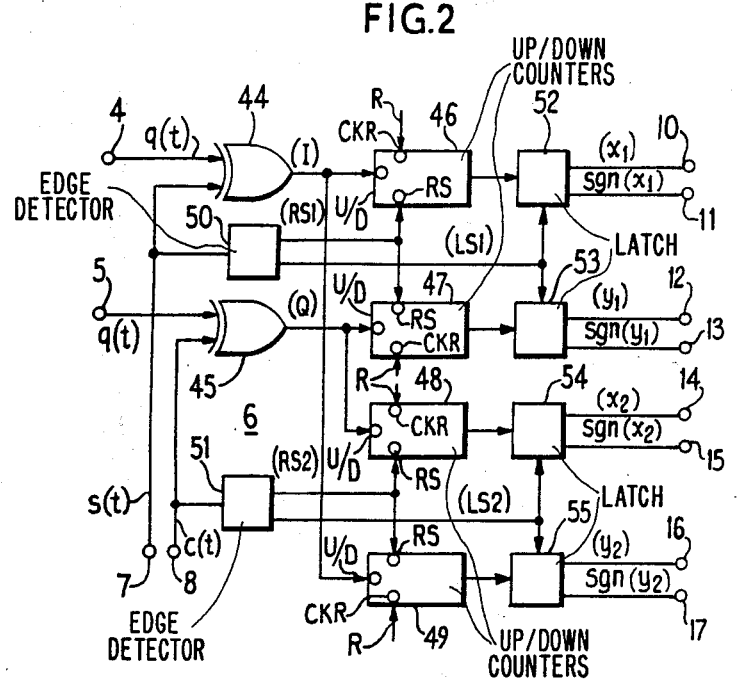
FIGS. 2 to 7 show respective block diagrams of various circuir arrangements of the demodulator of FIG. 1.

FIG. 2 shows an embodiment of the multiplying and measuring circuit arrangement 6. This embodiment comprises two exclusive-OR gates 44 and 45 having one input connected to inputs 4 and 5 to receive in common the signal q(t). The other input of the gate 44 is connected to the input 7 to receive the reference signal s(t), and the other input of the gate 45 is connected to the input 8 to receive the reference signal c(t). The two gate function as multipliers to produce the channel signals (I) and (Q), respectively. The channel signals (I) and (Q) are applied to the up/down control input U/D of two pairs of up/down counters 46,49 and 47,48. These counters are driven by counting pulses R from a count pulse clock source (not shown), for instance of a frequency of 150 KHz when a carrier frequency of 2400 Hz is used. The clock pulses are applied to a clock input CKR of each of these counters. Respective reset inputs RS for the counters 46 and 47 are connected to receive a reset signal (RS1) from an edge detector 50, and respective reset inputs RS for the counters 48 and 49 are connected to receive a reset signal (RS2) from an edge detector 51. In response to the respective channel signal (I) or (Q), the counters 46, 47, 48 and 49 undergo up-/down counts in accordance with the channel signal level. At each edge of the reference signal s(t), the numbers in the counters 46 and 47 are latched into respective latches 52 and 53 in response to a latching signal (LS1) from the edge detector 50, and at each edge of the reference signal c(t), the numbers in the counters 48 and 49 are latched into respective latches 54 and 55 in response to a latching signal (LS2) from the edge detector 51. The latched signals on the latches 52, 53, 54 and 55 represent the signals $(x_1)$, $sgn(x_1)$, $(y_1)$, $sgn(y_1)$, $(x_2)$, $sgn(x_2)$, $(y_2)$, and $sgn(y_2)$, as indicated.

Figure 3:
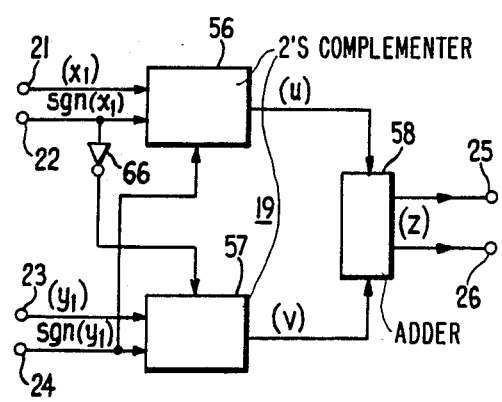

FIG. 3 shows an embodiment of the circuit arrangement 19 (FIG. 1) for processing some of these signals to produce a resultant error signal (z) as discussed earlier. This embodiment comprises a first 2's complementer circuit 56 to which the signals $(x_1)$ and $sgn(x_1)$ are applied, and a second 2's complementer circuit 57 to which the signals $(y_1)$ and $sgn(y_1)$ are applied. The circuit 56 is controlled by the signal $sgn(y_1)$ and the circuit 57 is controlled by the signal $sgn(x_1)$.

Output signals (u) and (v) of the circuits 56 and 57 are added in an adder circuit 58 to produce the resultant phase error signal (z) at the outputs 25, 26. The circuits 56, 57 and 58 function according to the following algorithm to produce the signal (z).

(u):=(x)
(v):=(y)
if (x)<0, then (v):=(−y)
if (y)<0, then (u):=(−x)
and (z)=(u)−(v).

The algorithm produces the results listed in Table II previously.

Because the adder circuit 58 in effect performs a subtraction process, the signal sgn(x) is inverted by an inverter 66 in its control of the 2's complementer 57. The error signal (z) is quadrature insensitive in that it takes no account of quad-phased data and is in 2's complement form.

Figure 4:
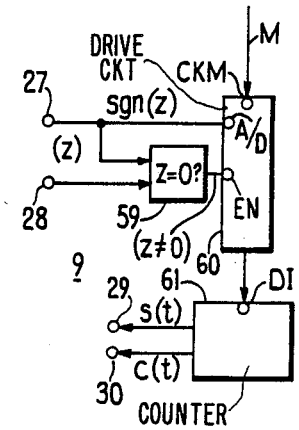

FIG. 4 shows an embodiment of the reference signal generator 9 (FIG. 1) to which the resultant error signal (z) (inputs 27 and 28) is applied. This reference signal generator comprises a decision circuit 59, a drive circuit 60 which is connected to receive clock pulses M from a drive pulse clock source (not shown), which pulses are applied to a clock input CKM, and an m-stage Johnson Counter 61 which is driven by the circuit 60. The decision circuit 59 is responsive to the signal (z) to provide a first output signal (z≠0) when the value of the signal (z) is not zero, and a second output signal sgn(z) representing the sign (+ or −) of the signal (z) is produced directly from the adder circuit 58. These first and second output signals are applied to the drive circuit 60. When the signal (z) is zero, neither of these two output signals is produced and the drive circuit 60 drives the counter 61 directly with drive pulses corresponding to the clock pulses M and applied to a drive input DI thereof, so that the phase of the reference signals s(t) and c(t) at outputs 29 and 30 remains unchanged. When the signal (z) is not zero, the output signal (z≠0) is applied to an "enable" input EN and the output signal sgn(z) is applied to an "add/delete" input A/D of the circuit 60. The result is that the drive circuit 60 will add drive pulses to (when sgn(z)= +) or delete drive pulses from (when sgn(z)= −) those applied to the counter 61 to alter the rate of the drive pulses applied to the counter 61 and thereby advance or retard the phase of the reference signals s(t) and c(t).

Figure 5:
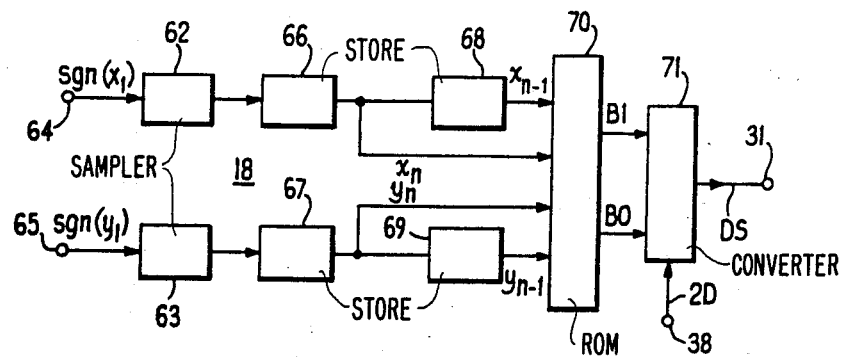

An embodiment of the data recovery circuit arragement 18 (FIG. 1) is shown in FIG. 5. This embodiment comprises two sampling circuits 62 and 63 which receive respectively the signals $sgn(x_1)$ and $sgn(y_1)$ applied to inputs 64 and 65 of the arrangement 18. The sampling is effected on the −ve edge of these signals and the dibit thus derived is fed into a 1-bit shift register comprising elements 66, 67, 68 and 69. This is done because it is necessary to compare the current dibit $x_n$, $y_n$ stored in the elements 66 and 67 with the previous dibit $x_{n-1}$, $y_{n-1}$ stored in the elements 68 and 69. The actual differential decoding itself is carried out by applying the current and previous dibits to a read-only memory 70. This memory 70 contains 16 locations corresponding to all possible bit combinations of current and previous dibits. The memory locations contain the data which correctly decodes the differential data and the contents of the memory 70 are shown in the following Table III.

TABLE III

| $x_{n-1}, y_{n-1}$ | $x_n, y_n$ | | | |
| --- | --- | --- | --- | --- |
|  | 00 | 01 | 011 | 10 |
| 00 | 01 | 11 | 10 | 00 |
| 01 | 00 | 01 | 11 | 10 |
| 11 | 10 | 00 | 01 | 11 |
| 10 | 11 | 10 | 00 | 01 |

The dibit output value B1, B0 from the memory 70 is applied to a bit serialiser circuit 71, which is a parallel-to-serial converter. During each baud period the decoded dibit B1, B0 is latched into the circuit 71 and then read out serially at twice the baud rate by the bit clock pulses 2D to produce the data signal DS at the output 31.

Figure 6:
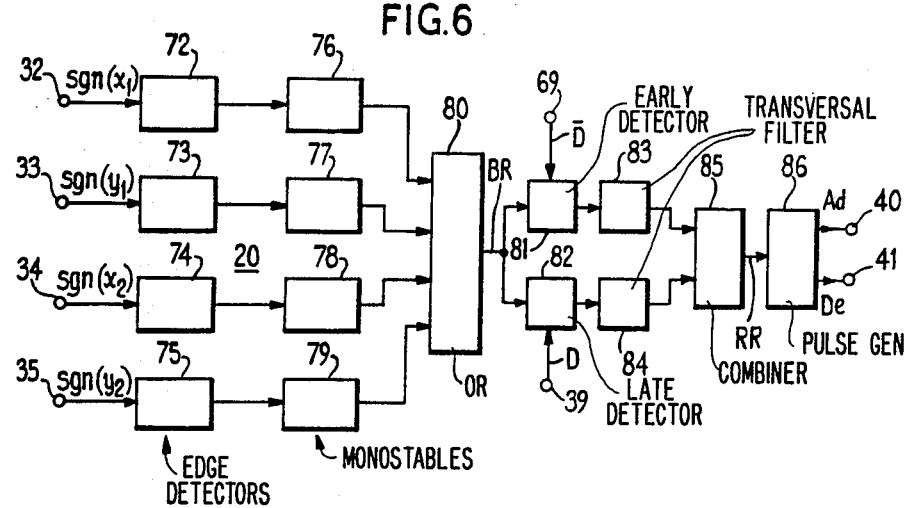

An embodiment of the circuit arrangement 20 for recovering the timing of the incoming baud rate is shown in FIG. 6. This circuit arrangement uses the data transitions present in the channel signals (I) and (Q), as represented by the sign signals $sgn(x_1)$, $sgn(y_1)$, $sgn(x_2)$, $sgn(y_2)$, to recover the baud rate of the incoming signal. Because of the low data sampling rate relative to the carrier frequency of the incoming signal, this recovery arrangement aims at maximising the baud rate information which is represented by the sign signals. These sign signals are already quantised to twice the carrier frequency as a result of the operations of the circuit arrangement 6 in each half cycle of both the reference signals s(t) and c(t). In the arrangement 20, the sign signals are applied from the inputs 32, 33, 34 and 35 to respective edge detectors 72, 73, 74 and 75 and the resultant signals fed into respective monostables 76, 77, 78 and 79 which produce narrow pulses on both +ve and −ve edges of the respective signal. These narrow pulses are ORed together by an OR-gate 80 to produce a final signal BR to which the baud rate clock pulses can lock. Because the baud rate transitions are detected between edges of both the reference signals s(t) and c(t), and because of these signals are separated in phase (and hence in time), the narrow pulses in the final signal BR tend to occur in pairs.

Figure 10:
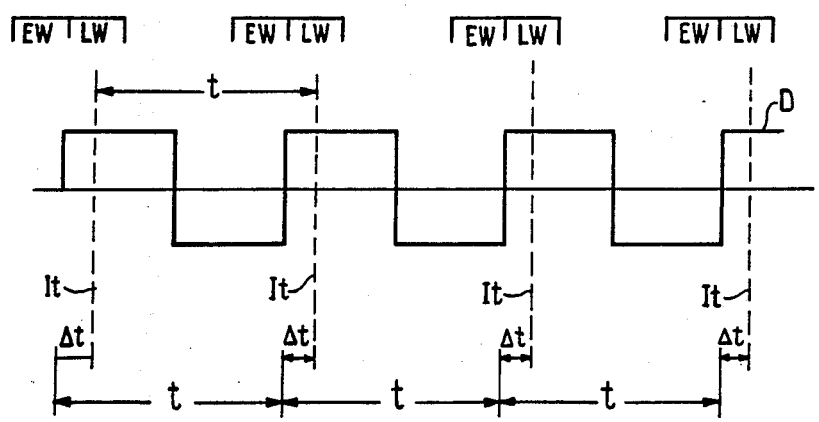

The arrangement 20 further comprises an 'early' detector 81 and a 'late' detector 82 to which the final signal BR is applied. These detectors also have applied to them the baud rate clock pulses D and their inverse $\overline{D}$, respectively, and are operable to detect whether the narrow pulses in the signal BR occur before or after the +ve edge of the clock pulses D. The method used is to set up two time windows, one of them before the +ve edge of the baud clock pulses D (the 'early window') and the other after (the 'late window'). Because the narrow pulses in the signal BR occur in pairs, and because the recovered baud rate clock +ve edges should be placed mid-way between these pairs of pulses, it is preferable to generate input pulses to transversal filters 83 and 84 only if two or more narrow pulses are detected in the same window in one baud period. This ensures that the correction of phase error is progressive in a given direction and tends to eliminate phase 'jitter' which may otherwise result when the two narrow pulses of a pair are detected in adjacent early and late windows, respectively. Each time two pulses are detected in the early window, a pulse is applied to the 'early' transversal filter 83, and each time two pulses are detected in the late window, a pulse is applied to the 'late' transversal filter 84. The transversal filters 83 and 84 sample at the baud rate, with the results from the early and late detectors 81 and 82 bbeing latched when they occur and sampled on the −ve edge of the recovered baud rate signal. This averages the occurrences of the early and late transitions. The waveform diagrams shown in FIG. 10 illustrate this method. The baud rate clock pulses D of period t as presently recovered are shown relative to late and early windows LW and EW. Input transitions It as represented by the narrow pulses in the signal BR occur in the late window LW in the example shown in FIG. 10. These transitions It have a time difference $\Delta t$ relative to the leading edges of the recovered baud rate clock pulses D.

The output signals of the transversal filters 83 and 84 are subtracted by a combining circuit 85, with the sign of the resultant signal RR indicating whether the phase of the baud rate clock should be advanced or retarded. The state where the difference is zero is also determined and used to stop any phase correction being made. This is achieved by applying the resultant signal RR to an early/late pulse generator circuit 86 which produces 'add' or 'delete' pulses Ad and De at outputs 40 and 41.

Figure 7:
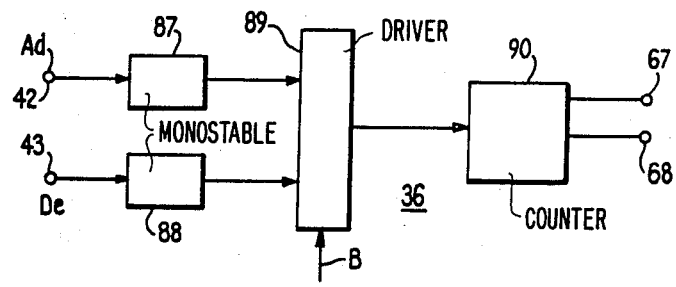

An embodiment of the baud rate clock pulse generator 36 (FIG. 1) is shown in FIG. 7. The 'add' and 'delete' pulses Ad and De received at inputs 42 and 43 are applied to respective monostable circuits 87 and 88 which feed control signals to a drive circuit 89. This drive circuit 89 supplies drive pulses to a counter 90. The drive circuit 89 receives baud rate clock pulses B from a clock pulses source (not shown) and applies them to the counter 90, without modification, or with the deletion or addition of pulses as determined by the control signals from the monostable circuits 87 and 88. The counter 90 supplies the baud rate and bit rate clock pulses D and 2D at outputs 67 and 68, respectively. In practice, a divider circuit (not shown) can provide the various pulses R, M and B from respective taps, the divider circuit itself being driven from a single high frequency pulse source.

From reading the present disclosure, other modifications will be apparent to persons skilled in the art. Such modifications may involve other features which are already known of themselves and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation or modifications thereof which would be apparent to persons skilled in the art, whether or not it relates to the same invention as presently claimed in any claim and whether or not it mitigates any or all of the same technical problems as does the present invention. The applicants hereby reserve the right to formulate new claims to such features and/or combinations of such features during the prosecution of the present application or of any further application derived therefrom.

I claim:

1. A method of phase-locking a locally generated baud rate clock signal in a coherent data demodulator to the baud rate of a received shift keyed signal which is phase-modulated to represent digital data,
    separately multiplying together a received shift keyed signal of a given carrier frequency and each of two quadrature phase versions of a locally generated carrier signal of said given frequency to produce two bi-level channel signals,
    determining with respect to each channel signal, in each period thereof occurring in each successive half cycle of one of the two channel signals, a respective first sign signal representing which is the predominant level of this channel signal in each half-cycle period for said one channel signals;
    determining with respect to each channel signal, in each period thereof occurring in each successive half cycle of the other of the two channel signals, a respective second sign signal representing which is the predominant level of this other channel signal in each half-cycle period for said other channel signals periods;
    producing a narrow pulse in respect of each of the four signals thus produced;
    combining all the narrow pulses into a single continuous pulse sequence;
    detecting in each period of the baud rate clock which narrow pulses in the sequence are early and which are late relative to an edge of the baud rate clock pulse; and
    advancing or retarding the phase of the baud rate clock in accordance with this detection to adjust the baud rate clock phase into a desired phase relationship with the baud rate transitions in the received shift keyed signal.

2. A method as claimed in claim 1, characterised in that the phase of the baud rate clock is advanced or retarded only in respect of successive pairs of early or late pulses, as the case may be.

3. A method as claimed in claim claim 2, characterised in that a number of early or late detections are averaged over a period before an increment of phase adjustment of the baud rate clock phase is effected.

4. An arrangement for phase-locking a locally generated baud rate clock to the baud rate of a received shift keyed signal which is phase-modulated to represent digital data, comprising:
    input means for receiving a phase-modulated shift keyed signal of a given carrier frequency;
    reference signal generator means for producing two quadrature phase versions of a locally generated carrier signal of said given frequency;

multiplier means connected to receive said shift keyed signal and said two locally generated carrier signal versions and operable to multiply separately the shift keyed signal with each said version to produce two bi-level channel signals;

first measuring means connected to receive said two channel signals and operable with respect to each channel to produce, for each period thereof occurring in each successive half cycle of one of the channel signals, a respective first sign signal representing which is the predominant level of this channel signal in each half-cycle period for said one channel signals;

second measuring means connected to receive said two channel signals and operable with respect to each channel to produce, for each period thereof occurring in each successive half cycle of the other of the two channel signals, a respective second sign signal representing which is the predominant level of the other channel signal in each half-cycle period for said other channel signals;

pulse means for producing a narrow pulse in respect of each of the four signal signals thus produced;

combining means for combining all the narrow pulses into a single continuous pulse sequence;

detector means for detecting in each period of the baud rate clock which narrow pulses in the sequence are early and which are late relative to an edge of the baud rate clock pulse; and means for advancing or retarding the phase of the baud rate clock in accordance with this detection to adjust the baud rate clock phase into a desired phase relationship with the baud rate transitions in the received shift keyed signal.

5. An arrangement as claimed in claim 4, characterised in that said first and second measuring means comprise two exclusive-OR gates connected to receive in common at respective first inputs a square wave version of the received signal and at respective second inputs respective quadrature phase versions of square wave form of a locally generated carrier signal, and first and second pairs of up/down counters, the up-/down operation mode of one counter of each pair being controlled by the output signal from one of said two exclusive-OR gates and the up/down operation mode of the other counter of each pair being controlled by the output signal from the other of said two exclusive-OR gates, each of said counters being connected to receive counting pulses from a count clock pulse source, each counter of one pair being reset by a reset signal on the occurrence of each edge of one of said two quadrature phase versions of a locally generated signal, and each counter of the other pair being reset by a reset signal on the occurrence of each edge of the other of said two quadrature phase versions of a locally generated carrier signal, the count present in each counter immediately before being reset each time representing the difference in the duration of the two levels of the relevant channel signal and the direction of the count respectively the signal of the difference, said sign signals being derived from said difference representation.

6. An arrangement as claimed in claim 5, characterised in that each of said counters is a binary counter and the counters have associated with them respective latching means into which their counts are latched.

7. An arrangement as claimed in claim 6, characterised in that said means for producing the narrow pulses from the sign signals are monostable circuits which are connected to receive a respective one of the sign signals from the counters.

8. An arrangement as claimed in claim 7, characterised in that transversal filters are provided to which early and late pulses produced by the detector means are applied, respectively, these filters operating to average these pulses over a period before producing an output signal to cause phase adjustment of the baud rate clock.

9. An arrangement as claimed in claim 8, characterised in that said baud rate clock is comprised by a counter which is fed with drive pulses from an associated drive circuit which is connected to a drive pulse clock source and also connected to receive the output signals from said filters, which drive circuit is responsive according to which filter on output signal is received from to add or delete drive pulses as applied by it from the drive pulse clock source to the counter.

10. A method as claimed in claim 1, characterized in that a number of early or late detections are averaged over a period before an increment of phase adjustment of the baud rate clock phase as effected.

11. An arrangement as claimed in claim 4, characterized in that transversal filters are provided to which early and late pulses produced by the detector means are applied, respectively, these filters operating to average these pulses over a period before producing an output signal to cause phase adjustment of the baud rate clock.

12. A coherent data demodulator for the demodulation of shift keyed signals which are phase-modulated to represent multi-bit date symbols, said demodulator including an arrangement for producing a phase error signal representative of the phase error between a received phase-modulated shift keyed signal of a given frequency and a locally generated carrier signal of nominally the same frequency, and an arrangement for phase-locking a locally generated baud rate clock to the baud rate of a received shift keyed signal which is phase-modulated to represent digital data, comprising:

input means for receiving a phase-modulated shift keyed signal of a given carrier frequency;

reference signal generator means for producing two quadrature phase versions of a locally generated carrier signal of said given frequency;

multiplier means connected to receive said shift keyed signal and said two locally generated carrier signal versions and operable to multiply separately the shift keyed signal with each said version to produce two bi-level channel signals;

first measuring means connected to receive said two channel signals and operable with respect to each channel to produce, for each period thereof occurring in each successive half cycle of one of the channel signals, a respective first sign signal representing which is the predominant level of this channel signal in each half-cycle period for said one channel signals;

second measuring means connected to receive said two channel signals and operable with respect to each channel to produce, for each period thereof occurring in each successive half cycle of the other of the two channel signals, a respective second sign signal representing which is the predominant level of the other channel signal in each half-cycle period for said other channel signals;

pulse means for producing a narrow pulse in respect of each of the four signal signals thus produced;

combining means for combining all the narrow pulses into a single continuous pulse sequence;

detector means for detecting in each period of the baud rate clock which narrow pulses in the sequence are early and which are late relative to an edge of the baud rate clock pulse; and means for advancing or retarding the phase of the baud rate clock in accordance with this detection to adjust the baud rate clock phase into a desired phase relationship with the baud rate transitions in the received shift keyed signal.

13. An arrangement as claimed in claim 12, characterised in that said first and second measuring means comprise two exclusive-OR gates connected to receive in common at respective first inputs a square wave version of the received signal and at respective second inputs respective quadrature phase versions of square wave form of a locally generated carrier signal, and first and second pairs of up/down counters, the up/down operation mode of one counter of each pair being controlled by the output signal from one of said two exclusive-OR gates and the up/down operation mode of the other counter of each pair being controlled by the output signal from the other of said two exclusive-OR gates, each of said counters being connected to receive counting pulses from a count clock pulse source, each counter of one pair being reset by a reset signal on the occurrence of each edge of one of said two quadrature phase versions of a locally generated signal, and each counter of the other pair being reset by a reset signal on the occurrence of each edge of the other of said two quadrature phase versions of a locally generated carrier signal, the count present in each counter immediately before being reset each time representing the difference in the duration of the two levels of the relevant channel signal and the direction of the count respectively the signal of the difference, said sign signals being derived from said difference representation.

14. A demodulator as claimed in claim 13, characterized in that each of said counters is a binary counter and the counters have associated with them respective latching means into which their counts are latched.

15. A demodulator as claimed in claim 13, characterized in that said means for producing the narrow pulses from the sign signals are monostable circuits which are connected to receive a respective one of the sign signals from the counters.

16. A demodulator as claimed in claim 13, characterized in that transversal filters are provided to which early and late pulses produced by the detector means are applied, respectively, these filters operating to average these pulses over a period before producing an output signal to cause phase adjustment of the baud rate clock.

17. A demodulator as claimed in claim 13, characterized in that said baud rate clock is comprised by a counter which is fed with drive pulses from an associated drive circuit which is connected to a drive pulse clock source and also connected to receive the output signals from said filters, which drive circuit is responsive according to which filter on output signal is received from to add or delete drive pulses as applied by it from the drive pulse clock source to the counter.

* * * * *